United States Patent
Chang

(10) Patent No.: US 7,394,038 B2
(45) Date of Patent: Jul. 1, 2008

(54) KEYPAD ASSEMBLY AND PORTABLE ELECTRONIC DEVICE WITH SAME

(75) Inventor: Ming-Shiung Chang, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 11/682,768

(22) Filed: Mar. 6, 2007

(65) Prior Publication Data

US 2008/0018499 A1    Jan. 24, 2008

(30) Foreign Application Priority Data

Jul. 21, 2006    (CN)    ............... 200610061751

(51) Int. Cl.
*H01H 13/70*    (2006.01)

(52) U.S. Cl. ....................... 200/341; 200/5 A

(58) Field of Classification Search ............. 200/5 A, 200/512, 517, 341, 344, 345; 341/22; 345/168, 345/169; 400/472, 490, 491.2, 495; 455/550.1, 455/575.1, 575.3, 575.4; 379/433.01, 433.04, 379/433.06, 433.07, 433.1

See application file for complete search history.

(56) References Cited

U.S. PATENT DOCUMENTS

| | | | | |
|---|---|---|---|---|
| 6,166,662 A * | 12/2000 | Chuang | ..................... | 341/22 |
| 6,355,890 B1 * | 3/2002 | Kuroda | ..................... | 200/5 A |
| 6,621,027 B1 * | 9/2003 | Shimizu et al. | ............. | 200/341 |
| 6,941,125 B2 * | 9/2005 | Montague | ................. | 455/404.1 |
| 6,968,054 B2 * | 11/2005 | Park | ............................. | 379/368 |
| 7,133,707 B1 * | 11/2006 | Rak et al. | ................. | 455/575.1 |
| 7,206,617 B2 * | 4/2007 | Hutchison et al. | ......... | 455/575.3 |
| 7,259,339 B1 * | 8/2007 | Babella | ...................... | 200/5 A |
| 7,262,379 B2 * | 8/2007 | Nishimura et al. | .......... | 200/314 |
| 7,266,194 B2 * | 9/2007 | Saeki et al. | .................. | 379/368 |

* cited by examiner

*Primary Examiner*—Michael A Friedhofer
(74) *Attorney, Agent, or Firm*—Jeffrey T. Knapp

(57) ABSTRACT

A keypad assembly (200) applied to a portable electronic device (300) includes at least one key (24), a base (30) and an elastic member (40). The base includes at least one fixing portion (34). The at least one fixing portion is divided into two positioning blocks (344) by means of a latching slot (342). The at least one key is fixed on the at least one fixing portion. The elastic member includes at least one latching portion. Each latching portion includes two latching apertures and a rib. Each positioning block is engaged in a corresponding latching aperture. Each rib is received in a corresponding latching slot.

17 Claims, 8 Drawing Sheets

KEYPAD ASSEMBLY AND PORTABLE ELECTRONIC DEVICE WITH SAME

BACKGROUND OF THE INVENTION

1. Field of the Invention

The present invention generally relates to key assemblies and, particularly, to a keypad assembly applied to a portable electronic device, such as mobile telephone, electronic notebook, and a portable electronic device with the same.

2. Description of Related Art

With the development of wireless communication and information processing technologies, portable electronic devices, such as mobile telephones and personal digital assistants (PDAs), are now in widespread use. These portable electronic devices enable consumers to enjoy high technology services, anytime and anywhere. A keypad assembly as an input terminal has been an indispensable member of a portable electronic device.

A typical keypad assembly is used for a portable electronic device including a printed circuit board therein. Several fixed contact points are formed on the printed circuit board and several dome switches respectively disposed above the fixed contact points. Referring to FIGS. 7 and 8, the keypad assembly 100 (i.e., the keypad), as illustrated, includes three keys 12, an elastic member 14, and a base 16. Three spaced blocks 162 protrude from an upper surface 164 of the base 16. Four cylindrical projections 166 extend from a lower surface 168 of the base 16. The elastic member 14 has three spaced rectangular through apertures 142 defined therein. In assembly, the fixing blocks 162 are respectively received in a corresponding through aperture 142 of the elastic member 14 so that the fixing blocks 162 are locked in the elastic member 14. The keys 12 are then respectively fixed on the fixing blocks 162 by means of a glue or another adhesive. Accordingly, the above key elements are assembled together. When the key 12 is pushed downward, the cylindrical projection 166 overcomes the elastic force from the dome switch so as to contact the fixed contact point, thereby generating a signal.

However, since miniaturization of the portable electronic device is desired, it would be helpful if the thickness of the elastic member 14 and the fixing blocks 162 could be reduced. This thickness reduction would, however, likely decrease the strength of the keypad assembly 100 and thus make the keypad assembly 100 more susceptible to breakage. In addition, since the contact area between the fixing blocks 162 and the elastic member 14 is reduced, the bonding force produced between the elastic member 14 and the fixing blocks 162 would likewise be reduced. As such, the keys 12 may be more prone to break away from the base 16 when the portable electronic device is dropped on the ground.

Therefore, a keypad assembly is desired in order to overcome the above-described problems.

SUMMARY OF THE INVENTION

In one embodiment thereof, a keypad assembly applied to a portable electronic device includes at least one key, a base, and an elastic member. The base includes at least one fixing portion. The at least one fixing portion is divided into two positioning blocks by a latching slot. The at least one key is fixed on the at least one fixing portion. The elastic member includes at least one latching portion. Each latching portion includes two latching apertures and a rib. Each positioning block is received in a corresponding latching aperture. Each rib is received in a corresponding latching slot.

Other advantages and novel features will become more apparent from the following detailed description when taken in conjunction with the accompanying drawings.

BRIEF DESCRIPTION OF THE DRAWINGS

Many aspects of the keypad assembly can be better understood with reference to the following drawings. Drawings are not necessarily drawn to scale, the emphasis instead being placed upon clearly illustrating the principles of the present keypad assembly. Moreover, in the drawings, like reference numerals designate corresponding parts throughout the several views.

DETAILED DESCRIPTION OF THE INVENTION

The present keypad assembly is suitable for portable electronic devices such as mobile phones, PDAs, and so on.

Figure 1:
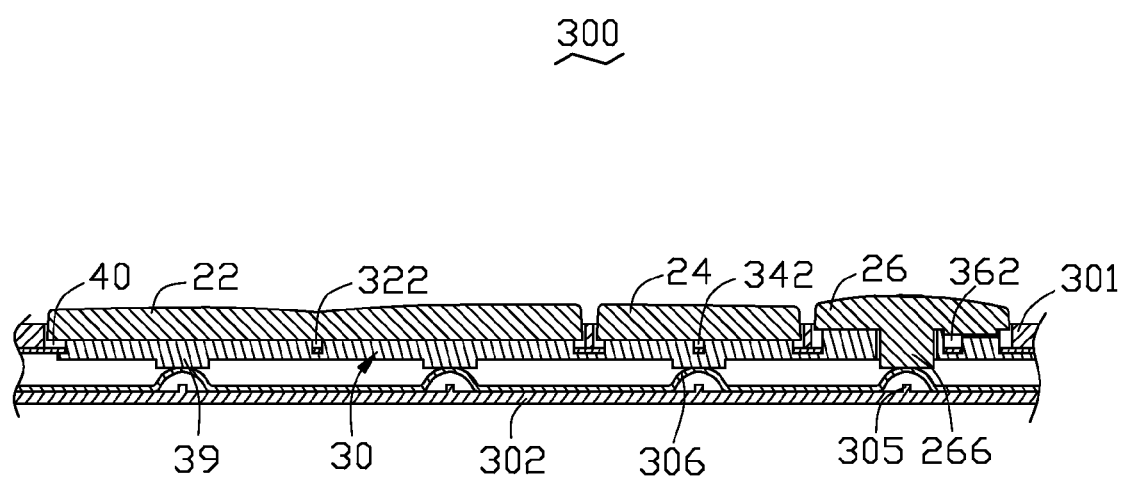
FIG. 1 is an isometric, cutaway view of an electronic device incorporating a keypad assembly, in accordance with a first embodiment.
Figure 2:
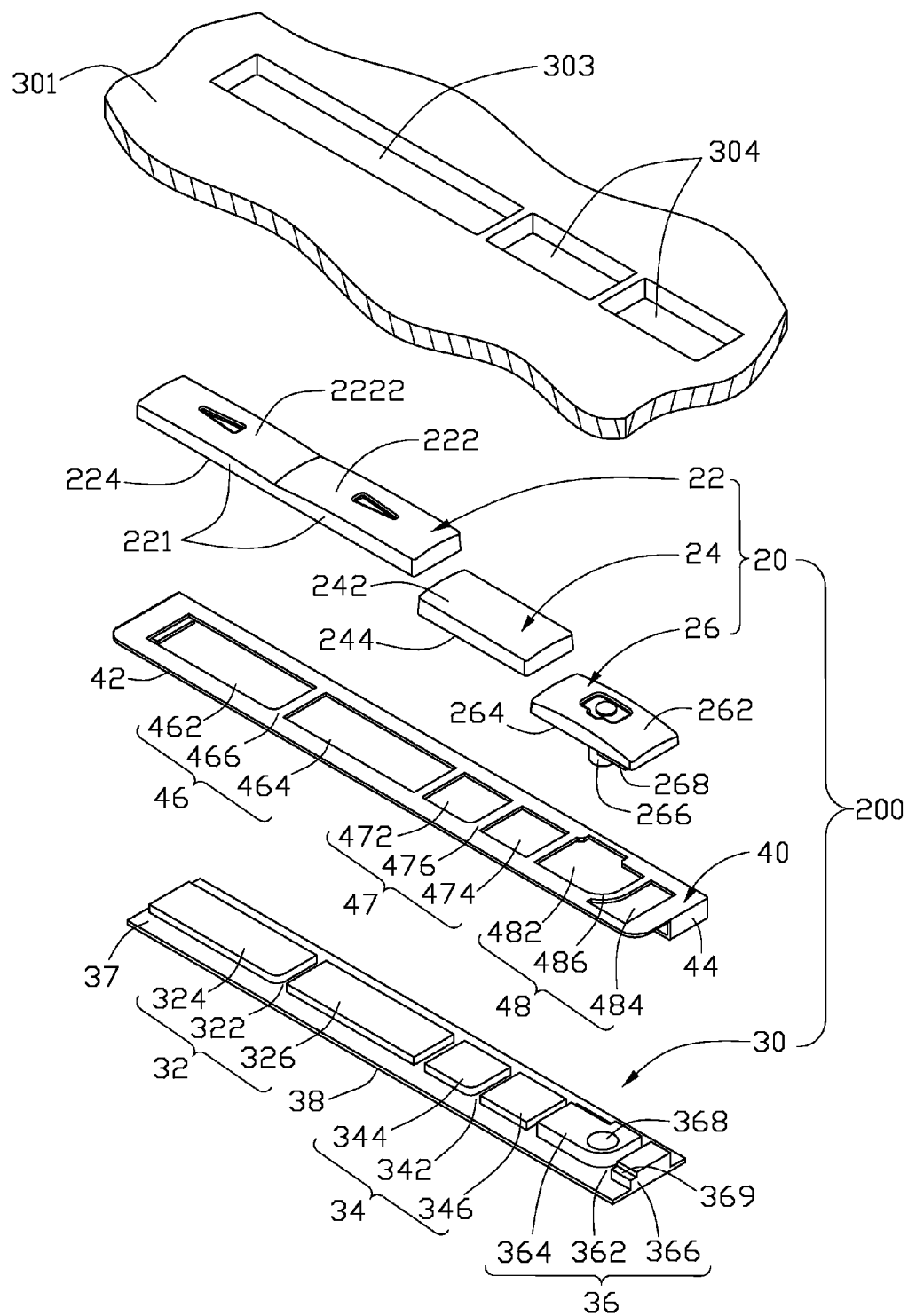
FIG. 2 is an isometric, exploded view of the keypad assembly and a shell of the electronic device shown in FIG. 1.

Referring to FIGS. 1 and 2, a keypad assembly 200 is used in a portable electronic device 300, according to a first embodiment of present invention. The portable electronic device 300 includes, in addition to the keypad assembly 200, a shell 301 and a printed circuit board 302 received in the shell 301. A large receiving hole 303 and two small receiving holes 304 are defined in the shell 301. Such receiving holes 303, 304 are spaced and distinct from one another and are aligned in an essentially linear formation. Further, the receiving holes 303, 304, are generally rectangular and extend through the shell 301. The printed circuit board 302 has four fixed contact points 305 formed thereon. Four dome switches 306 are respectively disposed above each fixed contact point 305. The keypad assembly 200 includes a key group 20, a base 30, and an elastic member 40. The keypad assembly 200 is used to facilitate the selective pressing of a chosen dome switch 306, so as to push the desired fixed contact point 305 to connect a circuit loop of the circuit board 302 and thereby generate a signal.

The key group 20 includes, for example, a control key 22, an operation key 24 and a function key 26. The keys 22, 24, 26 may, advantageously, be made of durable, flexible material, e.g., a plastic such as acrylonitrile-butadiene-styrene (ABS) or a light metal such as an aluminum alloy. The control key 22, in the illustrated embodiment, includes two function parts 221 integrally formed. Each function part 221 may be respectively operated, independent of the adjacent function part. The control key 22 includes an upper surface 222 and an opposite bottom surface 224. The upper surface 222 includes two operating surfaces 2222 connecting each other. The operation key 24 is a single function key and includes an arcuate operating surface 242 and a bottom surface 244. The function key 26 also is a single function key and has an operating surface 262 and a bottom surface 264. A column 266 perpendicularly extends from a central area of the bottom surface 264 configured (i.e., structured and arranged) for pressing a given dome switch 306 of the printed circuit board 302. A rectangular protrusion 268 is formed on one edge of the bottom surface 264 along a longitudinal direction.

The base 30 may, advantageously, be made of a durable, elastic material, such as rubber or another elastomeric material. The base 30 is generally rectangular and includes a first fixing portion 32, a second fixing portion 34, and a third fixing portion 36 disposed on an upper surface 37 thereof. The first fixing portion 32, the second fixing portion 34, and the third fixing portion 36 are arranged in line, and each two adjacent fixing portions are spaced from one another. The fixing portions 32, 34, 36 correspond to the keys 22, 24, 26, respectively. The first fixing portion 32 includes two similar adjacent first positioning blocks 324, 326. A first slot 322 is formed between the two first positioning blocks 324, 326. The second fixing portion 34 has two similar adjacent second positioning blocks 344, 346, and a second slot 342 is formed between the two second positioning blocks 344, 346. The third fixing portion 36 has two adjacent third positioning blocks 364, 366, which extend higher (i.e., have a greater height) than the other first and second positioning blocks 324, 326, 344, 346. One third positioning block 364 has a through hole 368 close to the other third positioning block 366 configured for receiving the column 266 of the function key 26. A step 369 is formed on the edge of the other third positioning block 366. The step 369 is configured for engaging with the protrusion 268 of the function key 26 so as to increase the bonding force between the function key 26 and the third fixing portion 36. A third slot 362 is formed between the two third positioning blocks 364, 366. Three cylindrical projections 39 extend from a lower surface 38 of the base 30. Two of the cylindrical projections 39 respectively correspond to a center portion of each of the first positioning blocks 324, 326, and another cylindrical projection 39 corresponds to a position where the second slot 342 between the two second positioning blocks 344, 346. The cylindrical projections 39 are used for pressing a given dome switch 306 on the printed circuit board 302 so as to push the fixed contact point 305, thereby generating a signal.

The elastic member 40 may, advantageously, be made of silicon rubber or another suitable elastomer. The elastic member 40 includes a main body 42 and two hooks 44 extending from two opposite ends of the main body 42. The main body 42 defines six spaced latching apertures 462, 464, 472, 474, 482, 484, in the form of rectangular through holes therein. Three ribs 466, 476, 486 are formed among the spaced latching apertures 462, 464, 472, 474, 482, 484, wherein the first rib 466 is between the apertures 462, 464, the second rib 476 is between the apertures 472, 474, and the third rib 486 is between the apertures 482, 484. The latching apertures 462, 464 and the first rib 466 together form a first latching portion 46 configured for engaging with the first fixing portion 32 of the base 30. The latching apertures 472, 474 and the second rib 476 constitute a second latching portion 47 configured for locking the second fixing portion 34 of the base 30. The latching apertures 482, 484 and the third rib 486 form a third latching portion 48 configured for receiving the third fixing portion 36 of the base 30.

In assembly of the keypad assembly 200, the elastic member 40 is placed on the base 30. The first, second, third positioning blocks 324, 326, 344, 346, 364, 366 are respectively aligned with the latching apertures 462, 464, 472, 474, 482, 484, and the ribs 466, 476, 486 correspond to the slots 322, 342, 362. Then, the elastic member 40 is pressed down so that the ribs 466, 476, 486 are respectively pushed into the first slot 322, the second slot 342, and the third slot 362. At the same time, the first, second, third positioning blocks 324, 326, 344, 346, 364, 366 are received in the latching apertures 462, 464, 472, 474, 482, 484 of the elastic member 40 so as to lock the base 30 in the elastic member 40. After that, some glue/adhesive is dropped on the bottom surfaces 224, 244, 264 or the upper surfaces of the first, second, third positioning blocks 324, 326, 344, 346, 364, 366. The keys 22, 24, 26 are then respectively placed on the first fixing portion 32, the second fixing portion 34, and the third fixing portion 36. The column 266 of the function key 26 is inserted in the through hole 368 of the third fixing portion 36. Accordingly, the keys 22, 24, 26 are fixed on the base 30. The assembly of the keypad assembly 200 is finished.

In assembly of the keypad assembly 200 to the portable electronic device 300, the control key 22, the operated key 24, and the function key 26 respectively pass through the large receiving hole 303 and the two small receiving holes 304 of the shell 301 from inside. The hooks 44 of the elastic member 40 are fixed on the shell 301 so that the keypad assembly 200 is fixed above the printed circuit board 302, and the column 266 of the function key 26 and the cylindrical projections 39 of the base 30 respectively correspond to the dome switches 306 on the printed circuit board 302.

To operate the keypad assembly 200, the user presses downward one operating surface 2222 of the control key 22. The control key 22 further brings the corresponding cylindrical projection 39 to push the dome switch 306, so that the dome switch 306 contacts the fixed contact point 305 of the printed circuit board 302, thereby generating an electronic signal.

A main advantage of the keypad assembly 200 is that each of the fixing portions 32, 34, 36 is divided into two parts, so as to form the latching slots 322, 342, 362. This structure allows three corresponding ribs 466, 476, 486 of the elastic member 40 to engage in the latching slots 322, 342, 362 so that the positioning blocks are stably locked in the elastic member 40 and are not easily shaken. Therefore, the keys 22, 24, 26 would not be easily disengaged from the base 30 if the portable electronic device 300 should happen to drop on the floor.

It should be understood that the number of the control key 22, the operation key 24 or the function key 26 might be changed. The number of the first fixing portion 32, the second fixing portion 34, the third fixing portion 36, the first latching portion 46, the second latching portion 47, and the third latching portion 48 are changed accordingly. Each of the operating surfaces of the control keys 22 and the operation keys 24 corresponds to a cylindrical projection 39 extending the lower surface 38 of the base 30. Each column 266 of the function key 26 corresponds to a through hole 368 defined in a corresponding third fixing portion 36.

Figure 3:
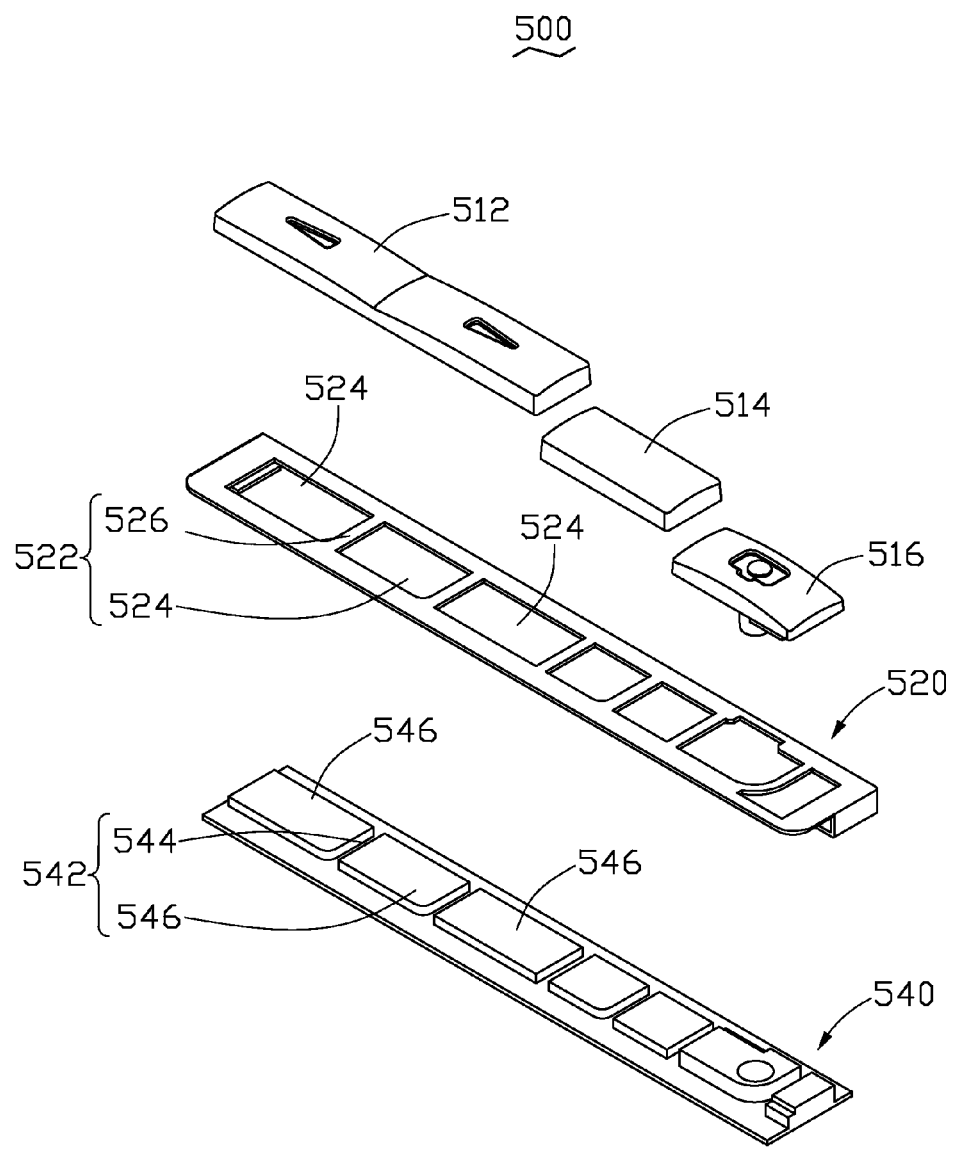
FIG. 3 is an isometric, exploded view of a keypad assembly in accordance with a second embodiment.

In a second embodiment of present invention, referred to FIG. 3, a keypad assembly 500 includes a control key 512, an elastic member 520 and a base 540. The elastic member forms a latching portion 522. The latching portion 522 has three latching apertures 524 and two ribs 526 separating each two adjacent latching apertures 524. The base 540 includes a fixing portion 542. The fixing portion 542 has two latching slots 544 defined therein so as to form three positioning blocks 546 engaged with the latching apertures 524. This structure may increase the bonding force between the elastic member 40 and the base 30 so that the structure of the keypad assembly 200 may be more stable.

Figure 4:
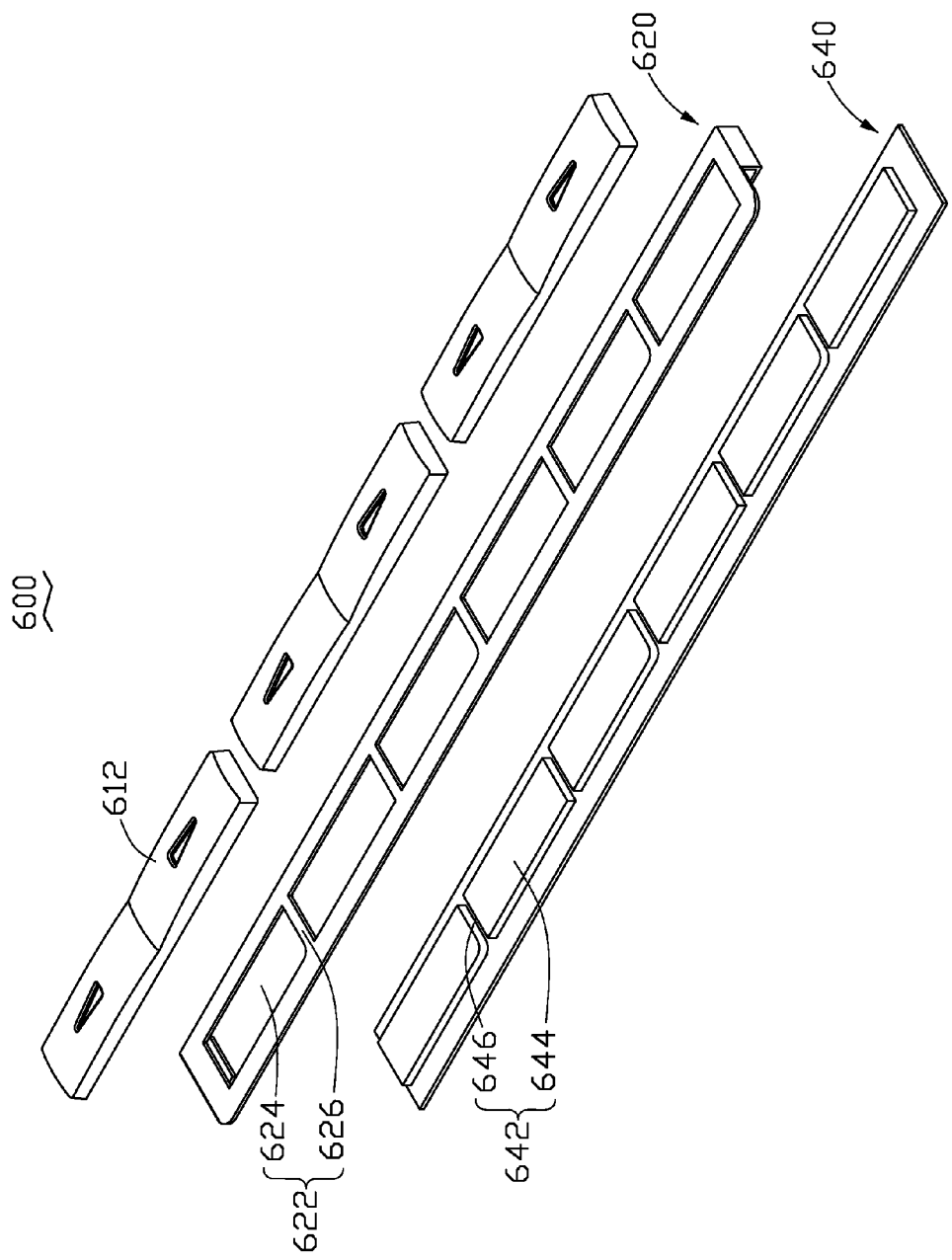
FIG. 4 is an isometric, exploded view of a keypad assembly in accordance with a third embodiment.

Referring to FIG. 4, in a third embodiment according to present invention, a keypad assembly 600 includes three control keys 612, an elastic member 620 and a base 640. Each control key 612 has two operating surfaces 6122. The elastic member 620 includes three first latching portions 622. Each first latching portion 622 has two latching apertures 624 and a rid 626 separating the two latching apertures 624. The base 640 includes three first fixing portions 642 engaged with the latching portions 622 respectively. Each first fixing portion 642 has two positioning blocks 644 and a latching slot 646 between the two positioning blocks 644. Each of the operating surfaces 6122 of the control key 612 corresponds to a cylindrical projection 39 extending from the lower surface 38 of the base 30.

Figure 5:
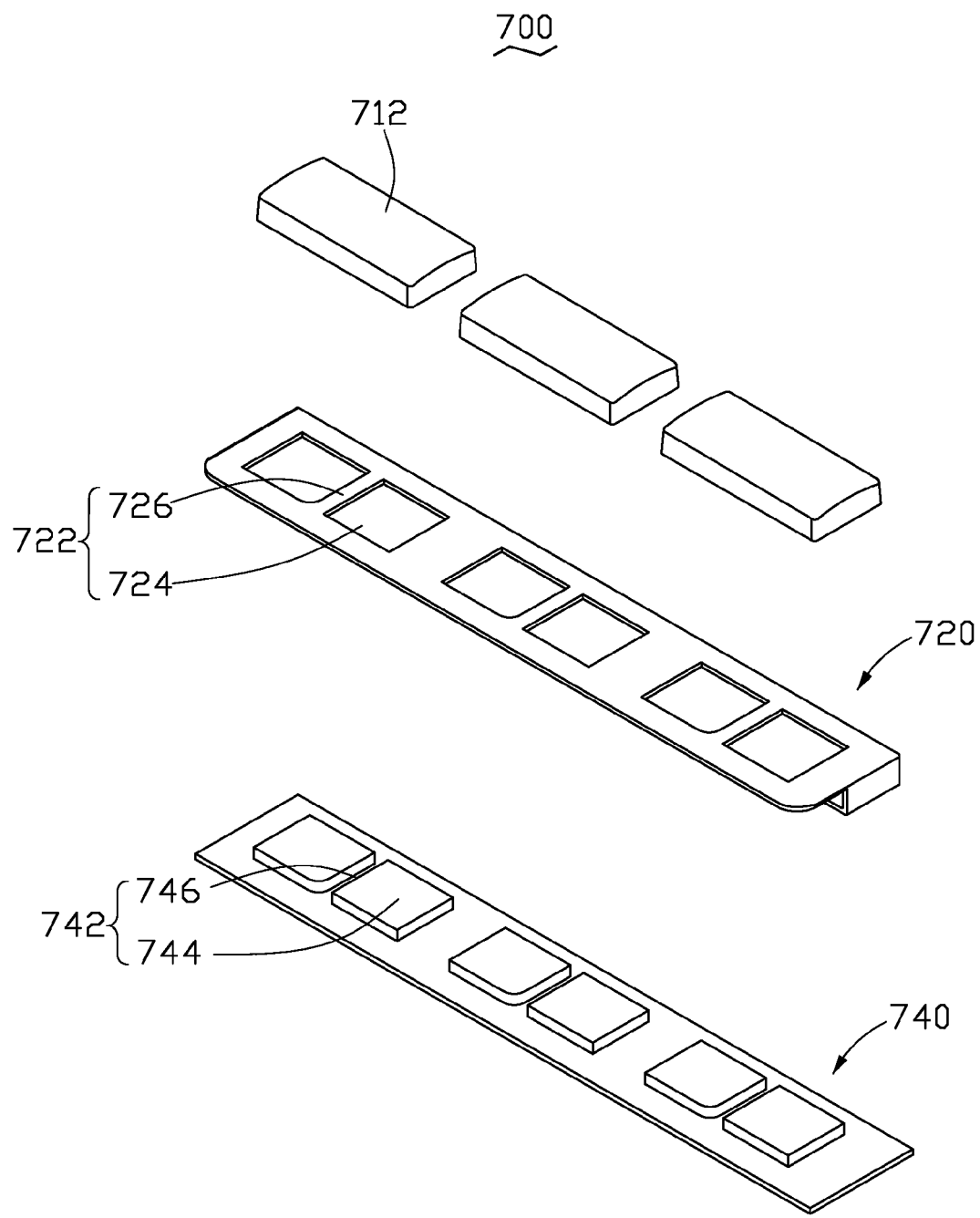
FIG. 5 is an isometric, exploded view of a keypad assembly in accordance with a fourth embodiment.

Referring to FIG. 5, in a fourth embodiment according to present invention, a keypad assembly 700 includes three operation keys 712, an elastic member 720 and a base 740. The elastic member 720 includes three second latching portions 722. Each second latching portion 722 has two latching apertures 724 and a rid 726 separating the two latching apertures 724. The base 740 includes three second fixing portions 742 engaged with the second latching portions 722 respectively. Each second fixing portion 742 has two positioning blocks 744 and a latching slot 746 between the two positioning blocks 744.

Figure 6:
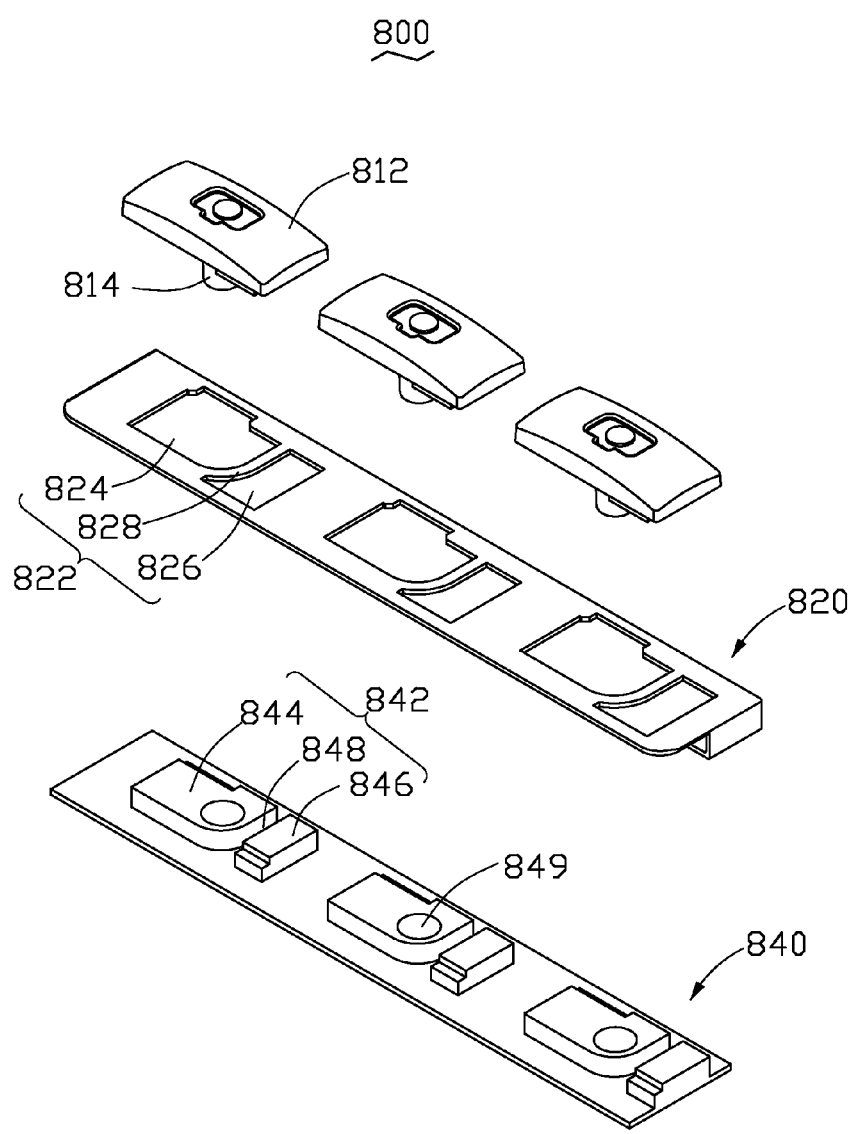
FIG. 6 is an isometric, exploded view of a keypad assembly in accordance with a fifth embodiment.
Figure 7:
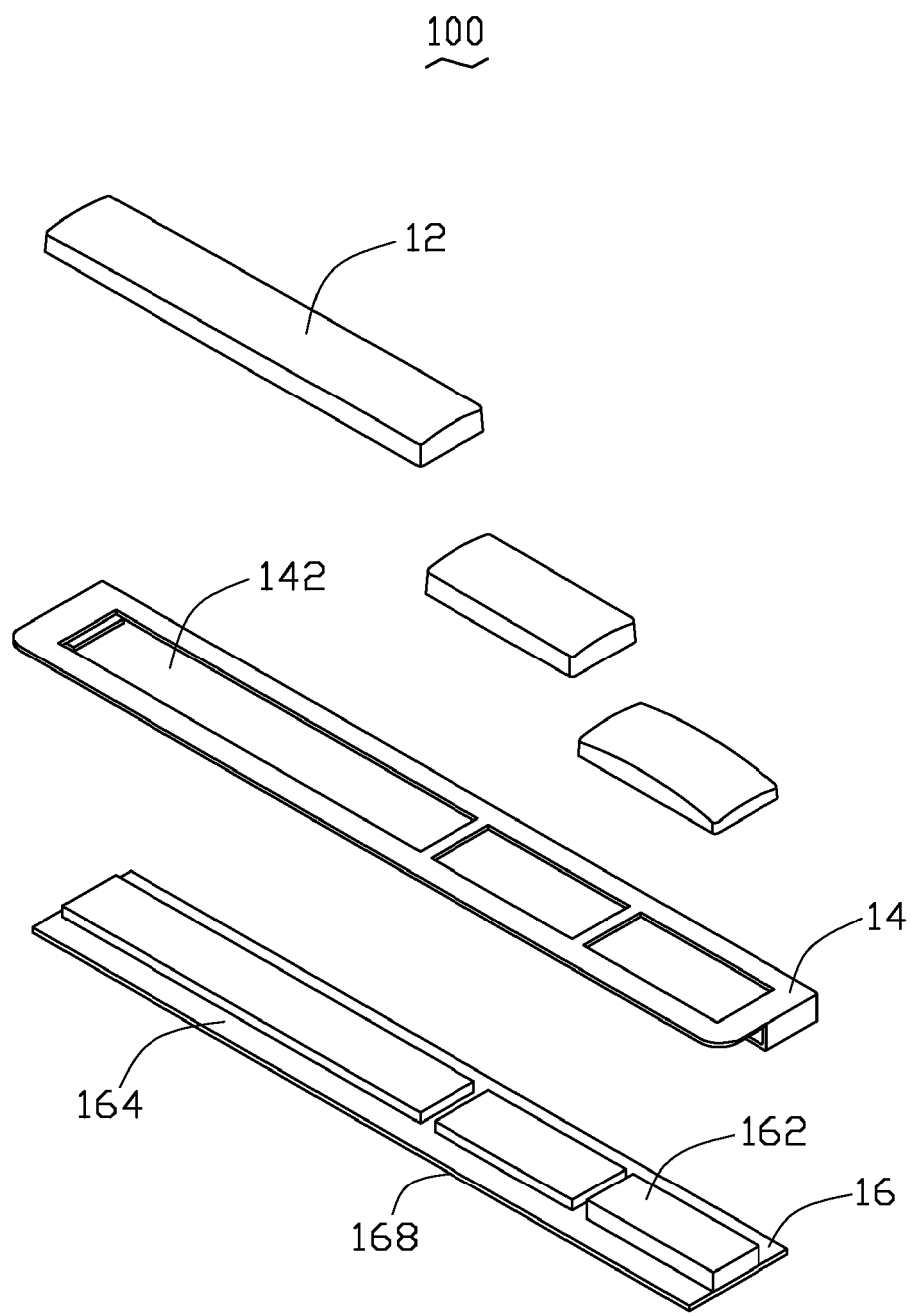
FIG. 7 is an isometric, exploded view of a typical keypad assembly.
Figure 8:
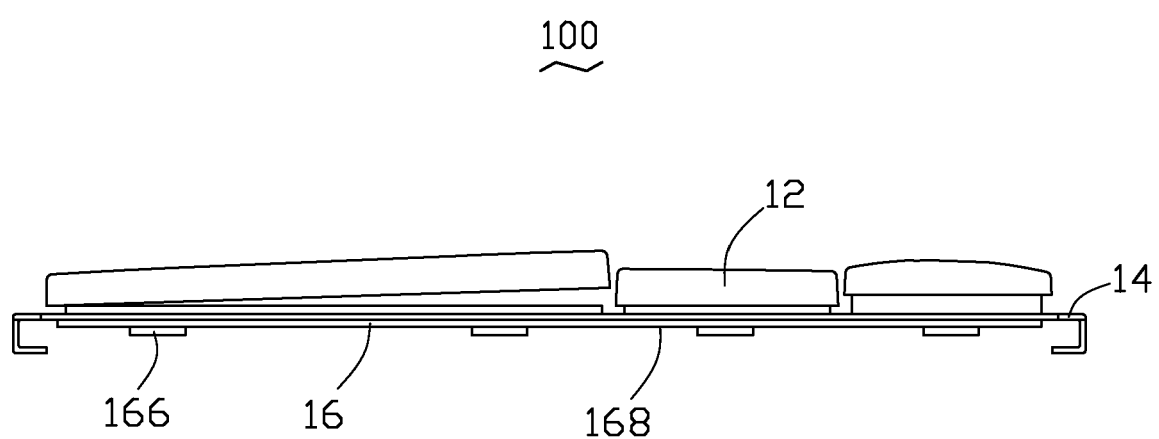
FIG. 8 is an isometric, assembly view of the keypad assembly shown in FIG. 7.

Referring to FIG. 6, in a fifth embodiment according to present invention, a keypad assembly 800 includes three function keys 812, an elastic member 820 and a base 840. Each function key has a column 814 extending from the bottom surface thereof. The elastic member 820 includes three third latching portions 822. Each third latching portion 822 has two latching apertures 824, 826 and a rid 828 separating the two latching apertures 824, 826. The base 840 includes three third fixing portions 842 engaged with the third latching portions 822 respectively. Each third fixing portion 842 has two positioning blocks 844, 846 and a latching slot 846 between the two positioning blocks 844, 846. Each positioning block 844 has a through hole 849 defined therein for receiving the columns 814 of the function key 812.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad assembly applied to a portable electronic device comprising:
   at least one key;
   a base including at least one fixing portion, the at least one fixing portion being divided into two positioning blocks by a latching slot, each key being fixed on a corresponding fixing portion; and
   an elastic member including at least one latching portion, each latching portion including two latching apertures and a rib, each positioning block being engaged in a corresponding latching aperture, each rib engaged in a corresponding latching slot.

2. The keypad assembly as claimed in claim 1, wherein the at least one key comprises a column extending from a lower surface thereof, and a through hole is defined in one positioning block of the at least one fixing portion and is configured for receiving the column.

3. The keypad assembly as claimed in claim 1, wherein a projection extends from a lower surface of the base, corresponding to the at least one key.

4. The keypad assembly as claimed in claim 1, wherein the at least one key comprises two function parts, and two projections extend from a lower surface of the base corresponding to the two function parts.

5. The keypad assembly as claimed in claim 1, wherein the keypad assembly comprises a control key and an operation key, the control key has two function parts, the base comprises a first fixing portion and a second fixing portion, the control key is fixed on the first fixing portion, the operation key is fixed on the second fixing portion, and three projections extend from a lower surface of the base corresponding to the two function parts of the control key and the operation key.

6. The keypad assembly as claimed in claim 1, wherein the keypad assembly comprises a control key and a function key, the control key includes two function parts, the function key has a column extending from the bottom center thereof, the base comprises a first fixing portion and a third fixing portion, the control key is fixed on the first fixing portion, the function key is fixed on the third fixing portion, and two projections respectively extend from a lower surface of the base corresponding to the two function parts of the control key.

7. The keypad assembly as claimed in claim 1, wherein the keypad assembly comprises an operation key and a function key, the function key has a column extending from the bottom center thereof, the base comprises a second fixing portion and a third fixing portion, a through hole is defined in one positioning block of the third fixing portion for receiving the column of the function key, the operation key is fixed on the second fixing portion, the function key is fixed on the third fixing portion, and a projections extend from a lower surface of the base corresponding to the operation key.

8. The keypad assembly as claimed in claim 1, wherein the keypad assembly comprise a control key, an operation key, and a function key, the control key includes two function parts, the function key has a column extending from the bottom center thereof, the base comprises a first fixing portion, a second fixing portion and a third fixing portion, a through hole is defined in one positioning block of the third fixing portion for receiving the column of the function key, the control key is fixed on the first fixing portion, the operation key is fixed on the second fixing portion, the function key is fixed on the third fixing portion, and three projections extend from a lower surface of the base corresponding to the two function parts of the control key and the operation key.

9. The keypad assembly as claimed in claim 1, wherein the elastic member includes two hooks, and the hooks are fixed in the portable electronic device.

10. The keypad assembly as claimed in claim 1, wherein the elastic member is made of an elastomeric material.

11. The keypad assembly as claimed in claim 1, wherein the at least one key comprises a protrusion on the edge thereof, and one of the two positioning blocks has a step configured for engaging with the protrusion.

12. A portable electronic device comprising:
   a shell;
   a printed circuit board fixed in the shell, the printed circuit board including at least one fixed contact point; and
   a keypad assembly fixed on the shell, including:
   at least one key;
   a base including at least one fixing portion, the at least one fixing portion divided into two positioning blocks by a latching slot, and each key fixed on a corresponding fixing portion; and
an elastic member including at least one latching portion, each latching portion made of two latching apertures and a rib, each positioning block engaged in a corresponding latching aperture, each rib engaged in a corresponding latching slot;

wherein when a given key is pressed down, a corresponding fixed contact point is contacted so as to generate an electronic signal.

13. The portable electronic device as claimed in claim 12, wherein a dome switch is disposed on the printed circuit board and above the at least one fixed contact point.

14. The portable electronic device as claimed in claim 13, wherein at least one projection extends from a lower surface of the base, and each projection corresponds to a dome switch.

15. The portable electronic device as claimed in claim 12, wherein the at least one key comprises a respective column extending from a lower surface thereof, a through hole is defined in the at least one fixing portion and is configured for receiving the respective column, and the respective column corresponds to the at least one dome switch.

16. The portable electronic device as claimed in claim 12, wherein the at least one key comprises two function parts, and two projections extends from a lower surface of the base corresponding to the two function parts.

17. The portable electronic device as claimed in claim 12, wherein the elastic member includes two hooks, and the hooks are fixed on the shell.

* * * * *